United States Patent [19]

Burley

[11] 3,985,997

[45] Oct. 12, 1976

[54] METHOD AND APPARATUS FOR CUTTING CLOTH

[76] Inventor: John Charles Burley, 47A Southwick St., Southwick, Brighton, Sussex, England, BN4 4TH

[22] Filed: Dec. 2, 1974

[21] Appl. No.: 529,001

Related U.S. Application Data

[63] Continuation-in-part of Ser. No. 442,582, Feb. 14, 1974, abandoned.

[30] Foreign Application Priority Data

Feb. 14, 1973 United Kingdom............... 7166/73

[52] U.S. Cl.............................. 219/384; 28/72 CS; 83/16
[51] Int. Cl.²........................................ H05B 7/18
[58] Field of Search ............... 219/383, 384; 83/16, 83/170; 28/72 CS; 346/74 S; 112/262; 57/34 HS

[56] References Cited

UNITED STATES PATENTS

| | | | |
|---|---|---|---|
| 1,206,093 | 11/1916 | Chapman........................ | 219/383 |
| 2,628,412 | 2/1953 | Vera................................ | 219/384 X |
| 2,763,759 | 9/1956 | Mito et al. ...................... | 219/384 |
| 3,228,366 | 1/1966 | Chezaub et al................. | 219/384 X |
| 3,705,291 | 12/1972 | Thompson...................... | 219/384 |
| 3,862,396 | 1/1975 | Machida et al.................. | 219/384 |

FOREIGN PATENTS OR APPLICATIONS

| | | | |
|---|---|---|---|
| 1,477,679 | 3/1967 | France............................. | 219/384 |
| 844,268 | 8/1960 | United Kingdom.............. | 219/384 |
| 908,665 | 10/1962 | United Kingdom.............. | 219/384 |

*Primary Examiner*—Volodymyr Y. Mayewsky
*Attorney, Agent, or Firm*—Brisebois & Kruger

[57] ABSTRACT

A method of cutting cloth into sections, for example for making up into a garment, is described in which spark discharges are passed through the cloth at the periphery of the sections from a first electrode shaped to follow the periphery of the sections on one side of a piece of cloth to a second electrode on the other side of the cloth. The second electrode may be a narrow strip closely following the periphery like the first electrode, a broader strip shaped to follow the periphery generally, or a sheet covering all the sections. Alternatively the second electrode may be a conductive rod which is moved over the cloth during the discharges. During cutting the cloth may be supported by a current of air.

5 Claims, 10 Drawing Figures

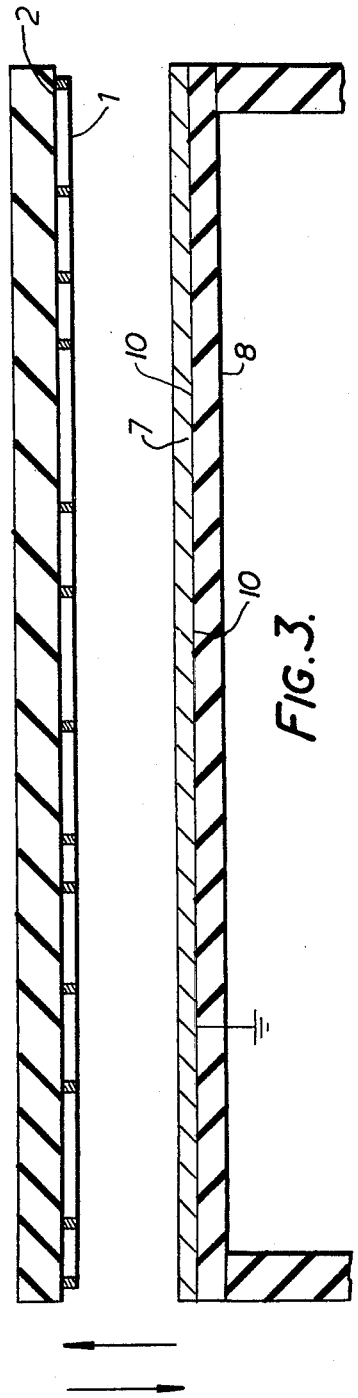
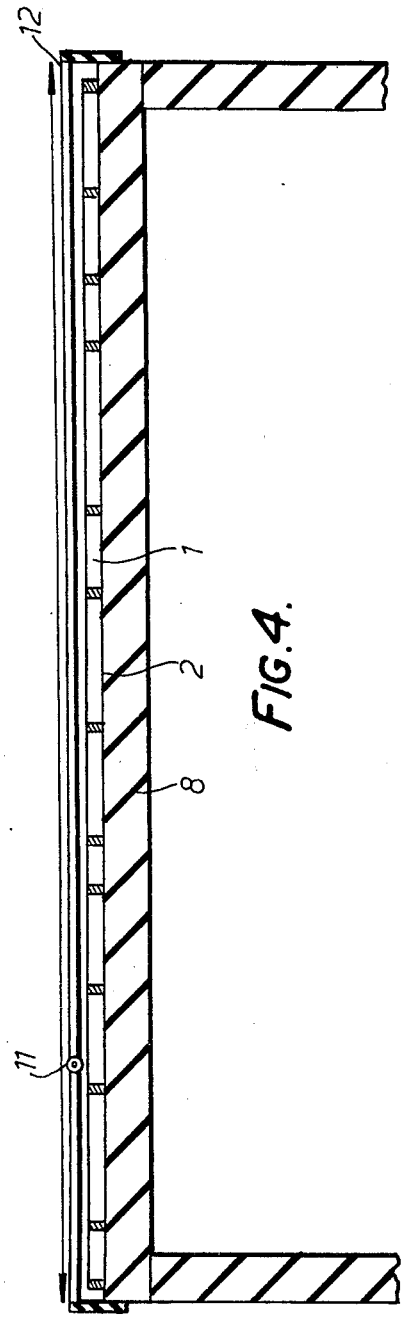

METHOD AND APPARATUS FOR CUTTING CLOTH

This application is a continuation in part of application Ser. No. 442,582 of Feb. 14, 1974 now abandoned.

This invention relates to a process and apparatus for converting lengths of material, for example cloth, into smaller pieces, for example garment sections.

The invention relates primarily to a stage in the manufacture of clothing and specifically such garments as suits or overcoats. Normally, templates are employed to define the shape of a section of a garment and to indicate the line of severance from the length of cloth from which the suit or coat is to be cut. Heretofore, the procedure has been to lay a thin template made of cardboard or similar material on the cloth and transfer the shape thereof by marking around the template edge with chalk, this line being followed by the blades of manually operated cutting shears.

It has been proposed to employ multiple knives in place of cutting shears or laser beams steered along a predetermined path by computer signals to burn and sever the fibres comprising the woven fabric but the latter method is very complicated and expensive and is still under development.

The object of this invention is to provide for quick and simple cutting of a length of cloth into garment sections automatically but without the need for such complicated and expensive devices.

The present invention provides a method of severing a portion of given shape from a piece of cloth by passing spark discharges through the cloth to an electrode following the periphery of the shape to be cut.

The electrical discharges used to sever the cloth is produced between electrodes lying closely adjacent the opposite faces of the cloth in such a way that the only region of the cloth to be closely adjacent to electrodes on both sides is that along the periphery of the shape to be cut. This can be achieved in a number of ways. For instance the electrode arrangement may consist of a first electrode lying closely adjacent the cloth only along the periphery of the shape to be cut, and a second electrode lying closely adjacent to at least those portions of the other face of the cloth which correspond to the periphery of the shape to be cut. This second electrode may even be a conductive sheet lying closely adjacent to substantially the whole of the said other face of the cloth. Alternatively the second electrode may, like the first, lie closely adjacent to the other face of the cloth only along the periphery of the shape to be cut. Another form that the second electrode can take is of a rod-shaped conductor arranged to pass closely adjacent to substantially the whole of the said other face of the cloth.

One form that an electrode which is to lie closely adjacent to the cloth only along the periphery of a shape to be cut can take is that of an elongate conductor, such as a wire or strip placed edge-on to the cloth. This can be formed around a template of the appropriate shape, in which case the template may be removed after the electrode has been correctly shaped and positioned.

If desired a number of individual garment sections can be severed simultaneously, the electrodes corresponding to separate sections being electrically connected either in series or parallel to suit the load conditions.

The electrical discharges occurring through the cloth when a succession of high voltage pulses is applied to the cloth through contacting electrodes cannot be positively identified as a train of discrete sparks or as a continuous arc. Henceforth it will be referred to as spark discharges, but this terminology will be understood to include within its ambit cases where the discharge produced is actually an arc.

The process of the invention is especially applicable to woolen fabrics, including fabrics made of a mixture of wool and synthetic materials, but is also applicable to the severing of sheet materials other than cloth, provided the materials behave in a similar way when heated by an electrical discharge passing through them.

The invention also provides apparatus for severing a portion of given shape from a piece of cloth which comprises means for generating a succession of high voltage impulses at a pair of output terminals for producing a spark discharge, a first elongate electrode electrically connected to one output terminal of the generating means for lying closely adjacent to one face of a piece of cloth, the electrode following the periphery of the given shape, a second electrode electrically connected to the other output terminal of the generating means for lying closely adjacent the other face of a piece of cloth and arranged to enable spark discharges to be passed through the cloth along the periphery of the given shape, and means for supporting a piece of cloth between the first and second electrodes.

One form of the apparatus to enable the various functions to be performed will now be described in more detail, by way of example only, with reference to the accompanying drawings, in which:

FIGS. 1(a), (b), (c) and (d) schematically show four possible arrangements of electrodes for the present invention.

FIG. 3 shows one form of apparatus suitable for use with the arrangement of FIG. 2.

FIG. 4 shows another form of apparatus.

FIG. 1 shows in cross-section four possible arrangements of electrodes for use in the present invention. In each case there is provided a surface 2 on which is securely located a first electrode 1. This is in the form of a shaped elongate conductor, for example 22 gauge copper wire, and is shaped to follow the periphery of the section of cloth to be severed. The electrode 1 may be a single length of shaped elongate conductor which thus severs only a single section, or it may consist of several such lengths each shaped to follow the periphery of a section to be severed, the separate lengths being electrically interconnected, as will be described, so as to enable the several separate sections to be severed simultaneously or during the same operation. Such an arrangement is shown in plan in FIG. 2. Here the electrodes 1 are securely located on the surface 2 having been initially formed around templates laid on the surface 2 and arranged so as to match the pattern of the cloth and give an economical use of it, the templates being removed after the electrodes 1 are securely located in position. The electrodes 1 may, where the material of the electrodes and of surface 2 allows, advantageously be located thereon by magnetic pads, or alternatively they may be spotwelded to angle brackets screwed to the surface 2.

Figure 1A:
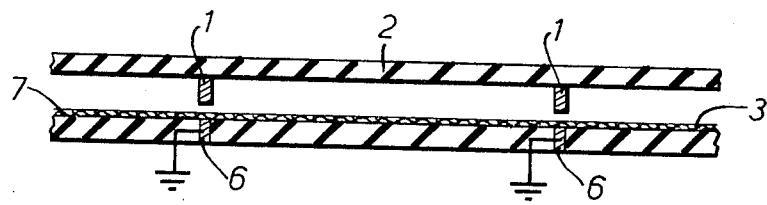

FIG. 3 shows a cross-section of the apparatus for use with the electrode arrangements of FIGS. 1(a), (b) and (c). Here there is provided a stationary bench 8 with a top surface 7, above and facing which is the surface 2, on which are located the electrodes 1 as described and which is capable of being lowered towards or raised from the surface 7. In operation a piece of cloth from which sections are to be severed is laid on the surface 7 in which is provided a second electrode shown as the electrode 10 of FIG. 1c, but which may take any of the forms of FIGS. 1(a), (b) or (c).

In FIG. 1(a) the second electrode 6 is in the form of a shaped elongate conductor, like the first electrode 1, and is shaped to follow the periphery of the sections to be severed, the separate lengths of conductor corresponding to separate sections being electrically interconnected as will be described. The electrodes 6 are let into the surface 7 so as to lie closely adjacent to, and if desired to contact, only these portions of the lower face of a piece of cloth 3 laid on the surface 7 that correspond to the peripheries of the sections to be severed. In operation, after the piece of cloth 3 has been positioned, the surface 2 is lowered towards the piece of cloth 3 so that the electrodes 1 lie closely adjacent to, or in contact with the upper face of the piece of cloth 3, the electrodes 1 being so positioned on the surface 2 as to correspond with the electrodes 6 as shown. Passing a spark discharge between the electrodes 1 and 6 as described below, causes the piece of cloth 3 to be quickly and accurately severed into the predetermined separate sections.

Figure 1B:
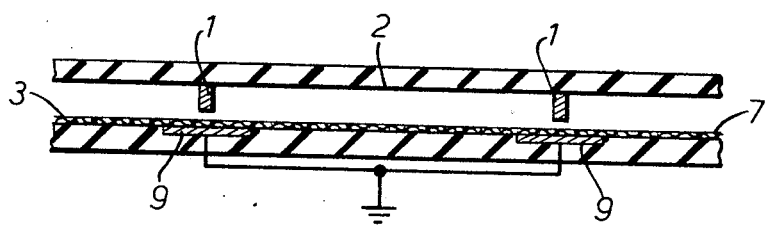

The arrangement of FIG. 1(b) is identical to that of FIG. 1(a) except that the second electrodes 9 are in the form of conductive sheets or plates let into the surface 7 so as to lie closely adjacent to, or in contact with at least those portions of the lower face of the piece of cloth 3 laid on the surface 7, that correspond to the peripheries of the sections to be severed. The electrodes 9 may in fact extend to any distance at either or both sides of the said peripheries, because the electrodes 1 determine the location of the spark discharge and consequently the line of severance of the cloth.

Figure 1C:
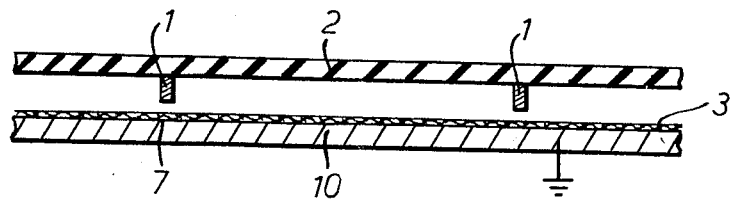

The arrangement of FIG. 1(c) is again identical to that of FIG. 1(a) except that, in this case, the lower electrode 10 is a conductive sheet extending over substantially the whole area of the piece of cloth 3 and on which the piece of cloth 3 is laid directly, the upper face of the electrode 10 itself forming the supporting surface 7.

Figure 1D:
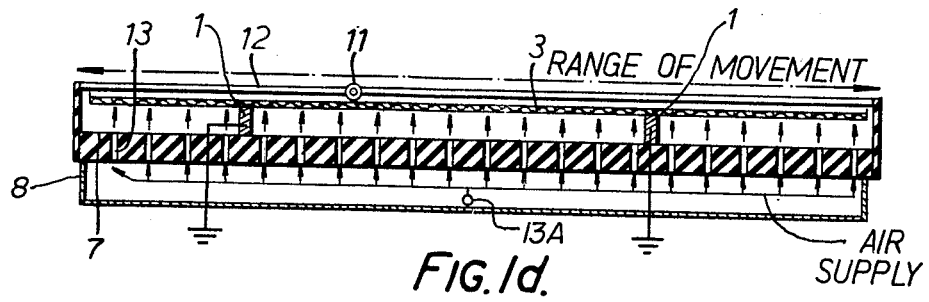

The arrangement of FIG. 1(d) shows in cross-section the supporting surface and electrodes of a form of apparatus shown in side view in FIG. 4. Here the stationary bench 8 has as its upper face the surface 7 on which are located, as described, the electrodes 1. In operation the piece of cloth 3 from which sections are to be severed is supported so as to lie above and closely adjacent to the electrodes 1 by a cushion of air blown at low pressure up against the lower face of the cloth through apertures 13 in the surface 2. The air is impelled through the apertures 13, via suitable ducting 13A, by a suitable fan unit, the flow of air being adjusted so that the piece of cloth 3 is supported uniformly between the separate portions of the electrodes 1 without sagging down appreciably or billowing up. The flow of air would be adjustable to allow for the different weights and porosities of different cloths.

This arrangement employs a second electrode 11 in the form of a rod or tube which is arranged to pass closely above substantially the whole of the upper face of the piece of cloth 3. As can be seen from FIG. 5 in which, for clarity, the apertures 13 have been omitted the rod electrode 11 extends across the width of the surface 2 and is arranged to be movable along the length of the surface 2, being supported on supports 12. In operation a piece of cloth 3 is supported closely above the electrodes 1 on the described air cushion and the rod electrode 11 is, after the electrical connections have been made as described below and the spark discharges have begun, moved along the length of the piece of cloth 3. At any given position of the cloth spark discharges pass between the rod electrode 11 and those points of the electrodes 1 which lie immediately below it (for example, the positions marked x on FIG. 5). The piece of cloth 3 is thus severed along the peripheries of the separate sections.

Figure 5:
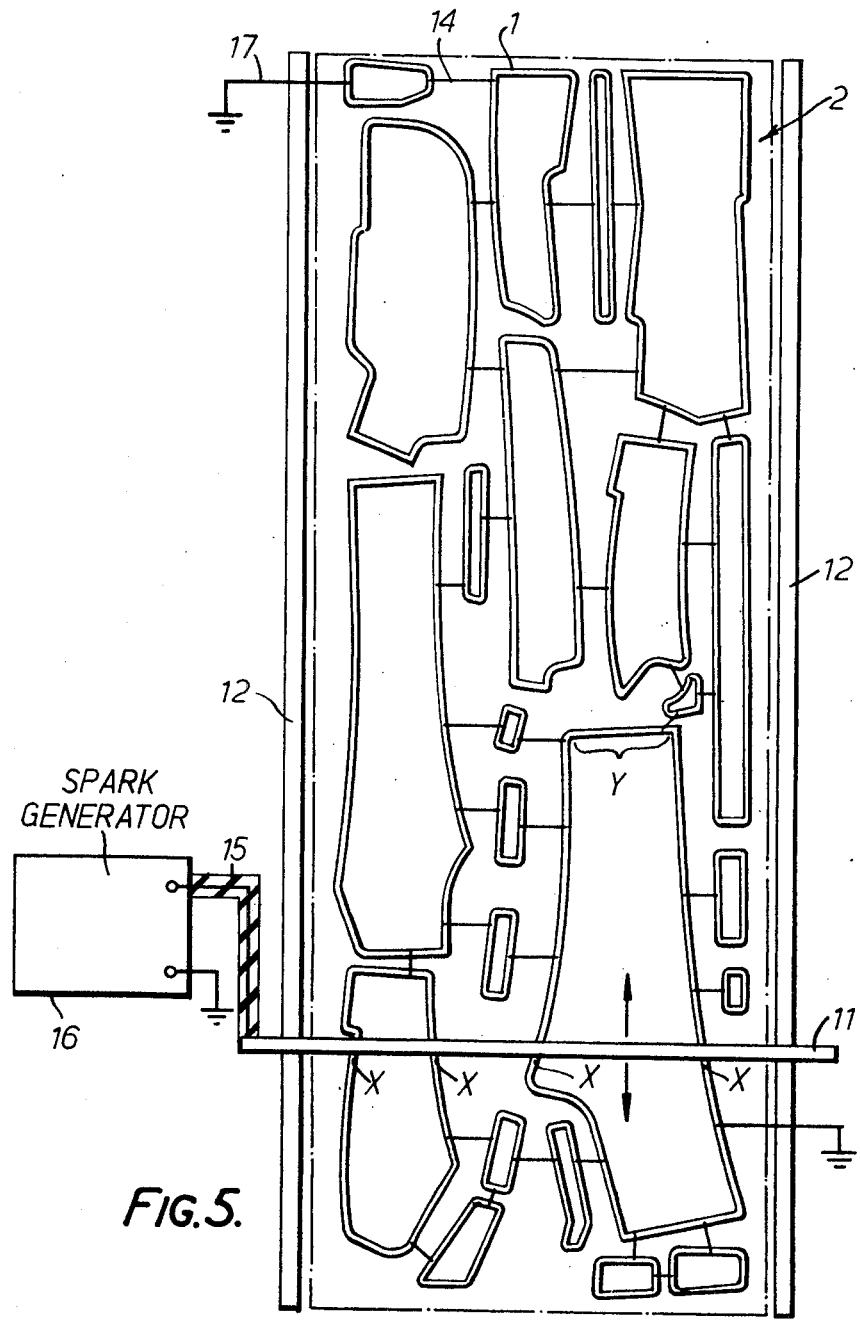
FIG. 5 shows a plan view of the apparatus of FIG. 4.
Figure 6:
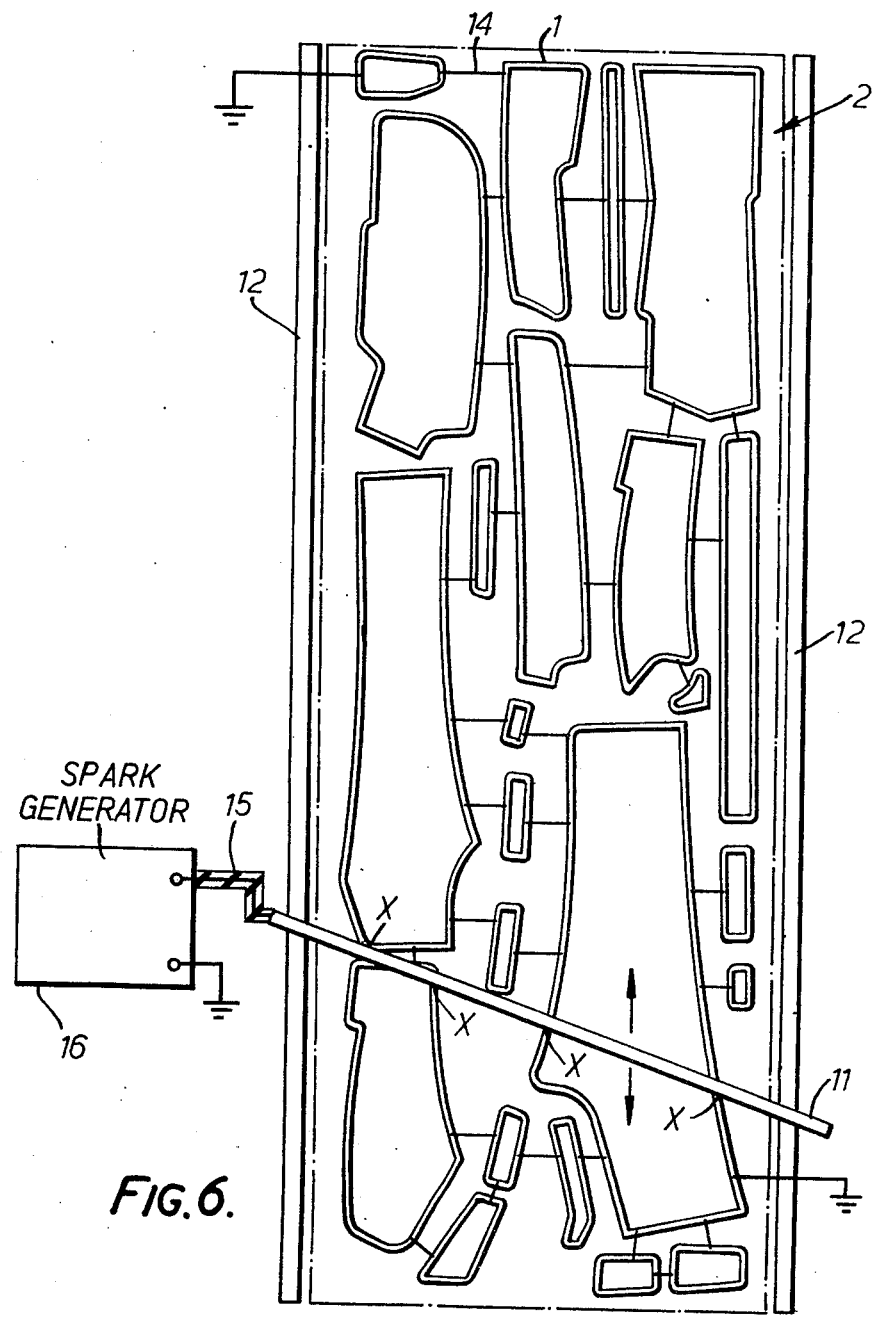
FIG. 6 shows a modification to the apparatus of FIG. 4.

An alternative to the arrangement of FIG. 5 is shown in FIG. 6. Here the rod electrode 11 is orientated at an angle, which may be variable, to the width of the surface 2. This arrangement avoids the need for simultaneous spark discharge between the rod electrode 11 and an appreciable length of the electrodes 1 that would occur when the rod electrode 11 come directly above a length of the electrodes 1 which ran substantially parallel to it. Such long lengths of sparking might be undesirable in certain circumstances, for instance if the increased power requirements could not be satisfactorily met. By suitably orientating the rod electrode 11 in this way, such occurrences may be avoided.

Figure 2:
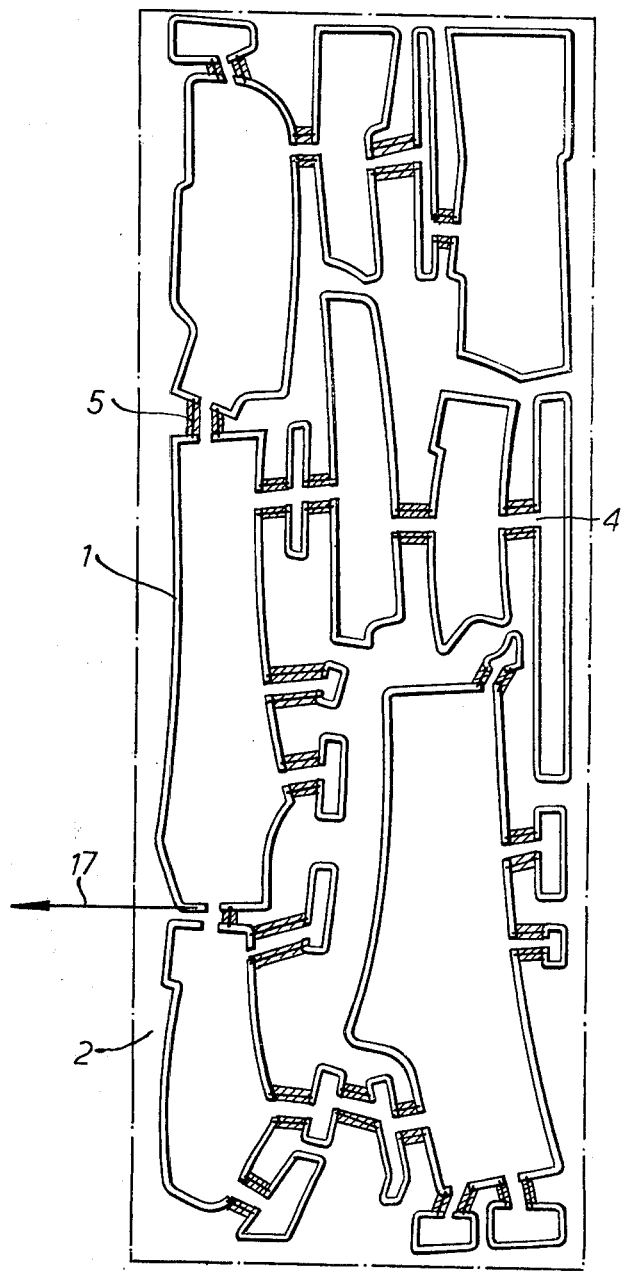
FIG. 2 shows a plan view of one form of electrodes.

The electrical connections employed in the various arrangements will now be described. In the arrangements of FIGS. 1(a), (b) and (c) the electrodes 1 are interconnected in the same way, as shown in FIG. 2. Here each separate length of conductor corresponding to a separate section to be severed is provided with one or more insulating gaps 4, which may if desired be filled with insulating material, and is connected with the other separate lengths of conductor by connecting wires 5, so that a continuous conducting path is provided along which the spark discharge current can travel. One end of this continuous conducting path is connected by a conductor 17 to one output terminal of a spark generator 16. The connecting wires 5 and 17 are insulated or otherwise prevented from passing spark discharges between themselves and any nearby portions of the second electrode. If the surface 2 is conducting, insulating means must be provided between the electrodes 1 and the surface 2. Adequate insulation and safety measures must be provided to protect operators of the apparatus.

The second electrodes 6 (FIG. 1(a) or 9 (FIG. 1(b)) are connected to earth as shown. It is not necessary to provide insulating gaps or to form a continuous conducting path, but merely to ensure that each separate section is connected to earth. The electrode 10 (FIG. 1(c) is similarly merely connected to earth. In any of the above arrangements the output terminal of the spark generator 16 not connected to the electrodes 1 is earthed to complete the spark discharge circuit.

In the arrangement of FIG. 1(d) the electrodes 1 are connected to earth. It is not necessary to provide insulating gaps or to form a continuous conducting path, but merely to interconnect the separate lengths corresponding to the separate sections to be severed with connecting wires 14 as shown in FIGS. 5 and 6 and thence to earth. One terminal of the spark generator 16 is connected by conductor 15 to the rod electrode 11, the other to earth. Again care must be taken to avoid spurious discharges.

Figure 7:
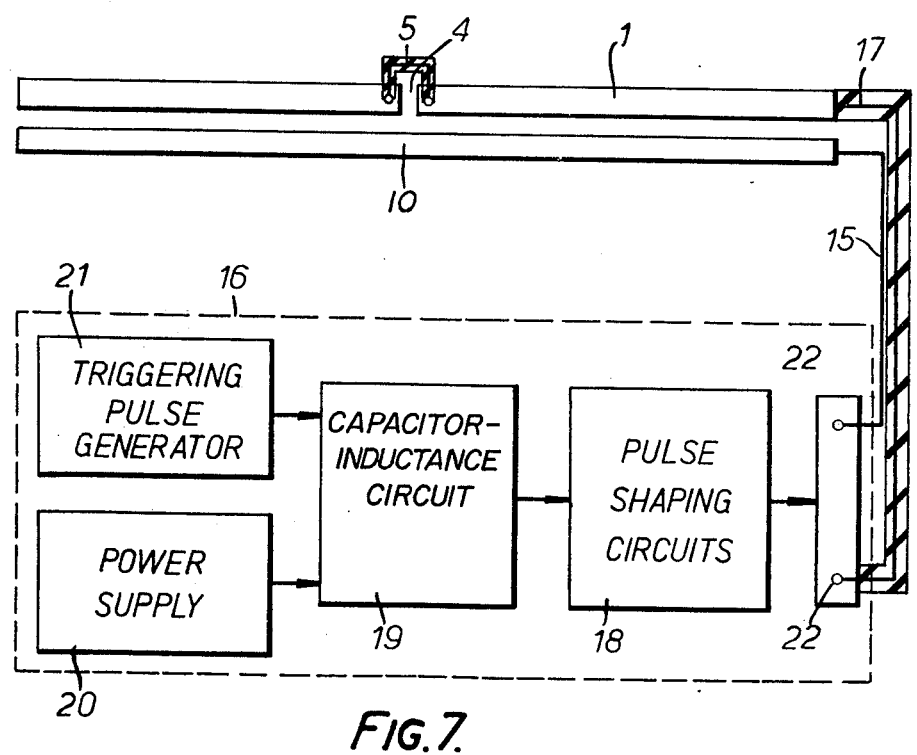
FIG. 7 shows diagrammatically electrical connections to a spark generator.

FIG. 7 shows diagrammatically the connection between sets of electrodes 1 and 10, and the high voltage impulse generator 16. The generator 16 consists of a power supply 20 driving a capacitor-inductance circuit 19 which is triggered by a pulse generating circuit 21. The high voltage impulses from the capacitor-inductance circuit 19 are shaped by a shaping circuit 18 and are applied to the electrodes by way of output terminals 22.

The spark generator which is preferably used is a capacitor-discharge circuit based on a commercially available capacitor-discharge motor vehicle ignition system (as described, for example, in "The Manual of Car Electronics" Graf & Whalen published in 1971 by Howard W. Sams & Co. Inc.) Such a circuit contains a power supply unit giving a high D.C. voltage, normally of some 400–600 v. The power supply unit may be the normal transformer/rectifier type operated from an AC mains supply or an invertor-rectifier type operated from a DC supply such as a storage battery, and is in either case fitted with a standard overload cut-out circuit that turns off the supply when its output is short-circuited. The high D.C. voltage output of this unit is connected across a storage capacitor in series with an inductance which forms the primary of a high voltage output transformer, for example an ignition spark coil. The series capacitor-inductance circuit so formed has connected across it a switching device such as a semi-conductor controlled rectifier (SCR) with its anode connected to the capacitor plate charged positively by the supply, and a diode, connected in the opposite sense. With a suitable power supply this diode may be the rectifying diode or bridge of the power unit. The switching input of the SCR is supplied with pulses from a pulse generating circuit at the desired spark frequency, which may be thus varied and may be 1,000 per second with suitable equipment. As each pulse reaches the gate of the SCR it renders it conducting, thus simultaneously shorting the supply, which is then turned off by its overload protection circuit, and effectively connecting the charged capacitor directly across the primary coil. The rapid discharge of the capacitor through the primary induces a rapidly rising voltage pulse in the secondary of 40 kV or more which forms the spark output. The shape of this spark output pulse may be suitably varied to vary the spark characteristics as desired. As the current in the oscillatory primary circuit reverses it drives the SCR into a non-conducting state and the diode connected across the SCR, being no longer shorted by it, by-passes the current. The power supply protection circuit senses that the supply is no longer shorted and re-connects the supply, which thus charges the capacitor in time for the next triggering pulse.

Although the invention has been described with reference to specific embodiments it is not limited to the embodiments, and other arrangements using the invention will be evident to those skilled in the art.

What I claim is:

1. Apparatus for severing a portion of given shape from a piece of cloth which comprises electrical means for generating a succession of high voltage impulses at a pair of output terminals for producing electrical spark discharges, a stationary lower electrode following the periphery of said given shape and electrically connected to one output terminal of the generating means, an apertured electrically insulating plate for supporting said first electrode closely adjacent to one face of a piece of cloth, means for directing an upward current of air through the apertures in said insulating plate beneath said cloth so that said cloth is maintained substantially flat on said lower electrode, an upper elongated movable electrode electrically connected to the other output terminal of the generating means, means for supporting said upper electrode for movement parallel to said first electrode closely adjacent the other face of said piece of cloth and arranged to enable electrical spark discharges to be passed between said electrodes through the cloth to cut from said cloth a portion having the shape of said enclosed area, and means for supporting said piece of cloth between the upper and lower electrodes.

2. Apparatus according to claim 1 wherein the upper electrode is a conducting rod and means is provided for moving the upper electrode during the spark discharges so as to sweep over an area within which the given shape can lie, the area overlapping the whole of the lower electrode.

3. Apparatus according to claim 2 wherein the angle of the conducting rod relative to the given shape is adjustable.

4. A method of severing a portion of a piece of cloth from the remainder thereof, which method comprises the steps of supporting said piece of cloth between an elongate movable upper electrode and a lower stationary electrode which electrodes are themselves supported for relative movement parallel to each other, and the lower of which electrodes substantially defines the periphery of an enclosed area,
   providing an apertured electrically insulating supporting plate beneath said lower electrode which supports said lower electrode,
   directing an upward current of air through the apertures in said plate beneath said cloth so that said cloth is maintained substantially flat on said lower electrode,
   providing electrical energy to said electrodes, and
   moving said upper electrode in a plane parallel to said lower electrode and thus causing electrical spark discharges to pass between said electrodes which cut through said cloth to sever therefrom a portion having the shape of said enclosed area.

5. A method as claimed in claim 4, wherein said upper electrode is in the form of a rod-shaped conductor arranged to pass closely over substantially the whole area of one face of the said piece of cloth during the discharges.

* * * * *